(12) United States Patent
Ling et al.

(10) Patent No.: US 9,242,539 B2
(45) Date of Patent: Jan. 26, 2016

(54) MOUNTING STRUCTURE FOR IN-VEHICLE POWER BATTERY AND VEHICLE COMPRISING THE SAME

(75) Inventors: Heping Ling, Shenzhen (CN); Bengang Yi, Shenzhen (CN); Wei Zeng, Shenzhen (CN); Fengshou Huang, Shenzhen (CN)

(73) Assignees: SHENZHEN BYD AUTO R&D COMPANY LIMITED, Shenzhen (CN); BYD COMPANY LIMITED, Shenzhen (CN)

( * ) Notice: Subject to any disclaimer, the term of this patent is extended or adjusted under 35 U.S.C. 154(b) by 18 days.

(21) Appl. No.: 14/234,578

(22) PCT Filed: Jul. 27, 2012

(86) PCT No.: PCT/CN2012/079303
§ 371 (c)(1),
(2), (4) Date: Jan. 23, 2014

(87) PCT Pub. No.: WO2013/017052
PCT Pub. Date: Feb. 7, 2013

(65) Prior Publication Data
US 2014/0166381 A1    Jun. 19, 2014

(30) Foreign Application Priority Data

Jul. 29, 2011  (CN) ...................... 2011 2 0271561 U

(51) Int. Cl.
*B60K 1/04*    (2006.01)
*B60R 16/04*    (2006.01)
(Continued)

(52) U.S. Cl.
CPC ............... *B60K 1/04* (2013.01); *B60L 11/1822* (2013.01); *B60L 11/1877* (2013.01);
(Continued)

(58) Field of Classification Search
CPC .......... B60K 1/04; B62D 61/02; B60R 16/04; B62K 2202/00; B62K 2204/00; B62K 11/10; B62K 2208/00; B60Y 2200/12; B62M 7/12; Y02T 10/7005; Y02T 10/705; B60L 11/1877; B60L 11/1879; B60L 11/1822; B60Y 2200/126

See application file for complete search history.

(56) References Cited

U.S. PATENT DOCUMENTS 3,870,563 A *  3/1975  Ruben ........................... 429/228
6,176,338 B1 *  1/2001  Nakagawa et al. ........... 180/219

FOREIGN PATENT DOCUMENTS

| CN | 201329795 Y | 10/2009 |
|---|---|---|
| CN | 201769670 U | 3/2011 |
| CN | 202174925 U | 3/2012 |

OTHER PUBLICATIONS

Shenzhen BYD Auto R&D Company Limited, International Search Report, PCT/CN2012/079303, Oct. 4, 2012, 3 pgs.

(Continued)

*Primary Examiner* — Brodie Follman
*Assistant Examiner* — Hilary L Johns
(74) *Attorney, Agent, or Firm* — Morgan, Lewis & Bockius LLP

(57) ABSTRACT

A mounting structure for an in-vehicle power battery may be provided. The mounting structure may comprise an upper cover (3), a suspension tray (1) and a bracket device (2) for supporting at least a part of a peripheral bottom portion of the suspension tray (1). The suspension tray (1) may be hermetically connected with the upper cover (3), forming a sealed space for receiving the power battery. The bracket device (2) may be detachably fixed to a bottom surface of the body floor. Further, a vehicle (100) comprising the mounting structure described above may also be provided.

11 Claims, 4 Drawing Sheets

(51) Int. Cl.
  *B60L 11/18* (2006.01)
  *B62M 7/12* (2006.01)
  *B62K 11/00* (2006.01)
  *B62D 61/02* (2006.01)
  *H01M 2/10* (2006.01)

(52) U.S. Cl.
  CPC ............ *B60L 11/1879* (2013.01); *B60R 16/04* (2013.01); *B62D 61/02* (2013.01); *B62K 11/00* (2013.01); *B62M 7/12* (2013.01); *H01M 2/1083* (2013.01); *B60K 2001/0438* (2013.01); *B60K 2001/0472* (2013.01); *H01M 2220/20* (2013.01); *Y02T 10/705* (2013.01)

(56) References Cited

OTHER PUBLICATIONS

Shenzhen BYD Auto R&D Company Limited, International Search Report, PCT/CN2012/079302, Oct. 25, 2012, 3 pgs.

* cited by examiner

A-A

MOUNTING STRUCTURE FOR IN-VEHICLE POWER BATTERY AND VEHICLE COMPRISING THE SAME

CROSS-REFERENCE TO RELATED APPLICATIONS

This application is a United States National Stage Application filed under 35 U.S.C. §371 of PCT Patent Application Serial No. PCT/CN2012/079303 filed on Jul. 27, 2012, which claims priority to and benefits of Chinese Patent Application Serial No. 201120271561.7, filed on Jul. 29, 2011, the entire contents of which are incorporated herein by reference.

This application is related to U.S. Utility patent application Ser. No. 14/234,581, "Mounting Structure for In-Vehicle Power Battery and Vehicle Comprising the Same," filed on Jan. 23, 2014, the contents of which is incorporated by reference herein in its entirety.

FIELD

The present disclosure relates to the field of vehicle, more particularly to a mounting structure for an in-vehicle power battery and a vehicle comprising the same.

BACKGROUND

The statements in this section merely provide background information related to the present disclosure and may not constitute prior art.

Commonly, power batteries in an electric vehicle or a hybrid powered vehicle are accommodated in a suspension tray which is provided under a body floor of a vehicle. And normally the peripheral edge of the suspension tray is connected to the body floor, thus the power battery may be mounted under the body floor. However, because the body floor is not sealed, liquid such as water etc. may flow from the body floor to the power battery to bring damage to the power battery accordingly.

However, the in-vehicle power battery may be easily polluted or damaged by water or dust etc, it may reduce the using life or even damage the in-vehicle power battery. Thus, the protection of the in-vehicle power battery is required.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In viewing thereof, the present invention is directed to solve at least one of the problems existing in the art. Accordingly, a mounting structure of in-vehicle power battery may need to be provided, which may protect the battery against contamination from water or dust etc, and make sure the battery can work normally after a long-term use.

According to an embodiment of the present disclosure, a mounting structure for an in-vehicle power battery may be provided. The mounting structure may comprise an upper cover, a suspension tray and a bracket device for supporting at least a part of a peripheral bottom portion of the suspension tray. The suspension tray may be hermetically connected with the upper cover, forming a sealed space for receiving the power battery. The bracket device may be detachably fixed to a bottom surface of the body floor.

Thus, due to the sealing structure mentioned above, the power battery may not be easily contaminated by water or dust etc., thus extending the life time span of the power battery accordingly.

In one embodiment, a vehicle comprising the above mounting structure is provided.

Other advantages and features of the disclosure are described below.

BRIEF DESCRIPTION OF THE DRAWINGS

These and other aspects and advantages of the disclosure will become apparent and more readily appreciated from the following descriptions taken in conjunction with the drawings, in which.

DETAILED DESCRIPTION

Figure 1:
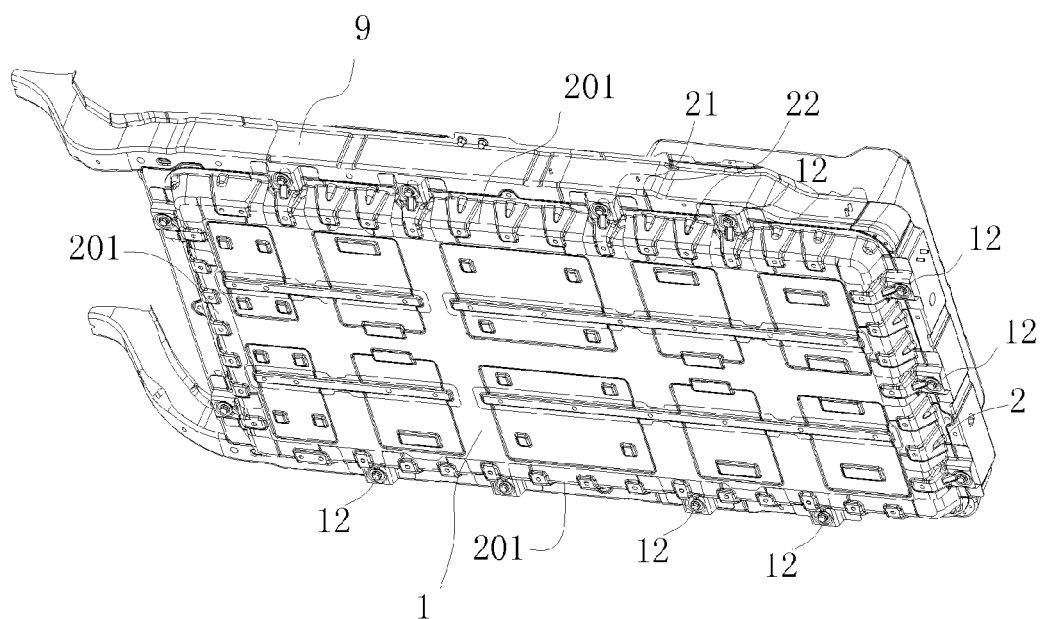
FIG. 1 is a schematic bottom perspective view of a mounting structure for an in-vehicle power battery according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. It is to be understood that, the embodiments described herein are merely used to generally understand the present disclosure, but shall not be construed to limit the present disclosure.

In the following, detailed description of a mounting structure for an in-vehicle power battery will be described, in which like numerals refer to like elements through the accompanying figures.

Figure 2:
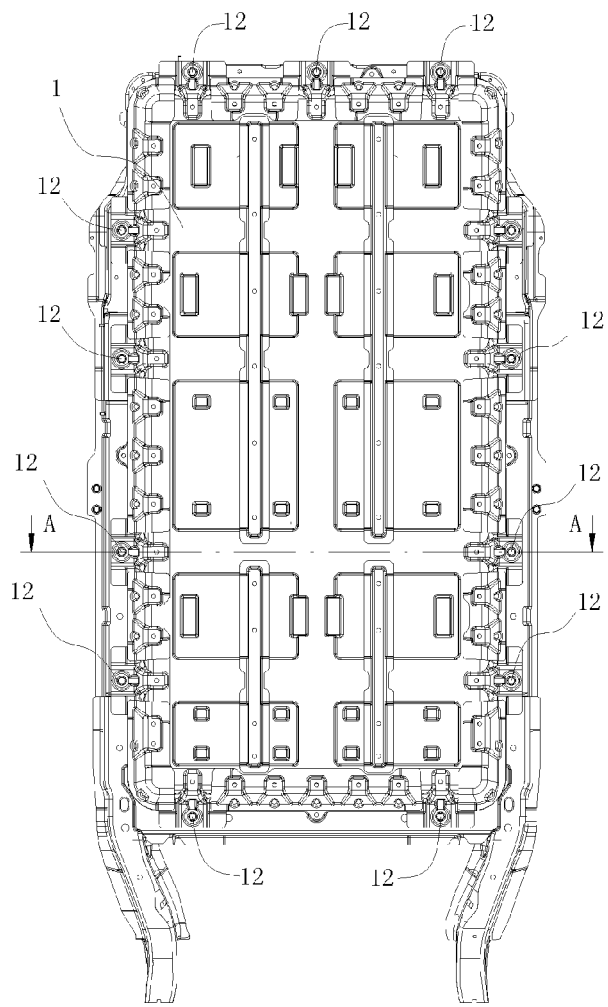
FIG. 2 is a schematic bottom view of a mounting structure for an in-vehicle power battery according to an embodiment of the present disclosure.
Figure 3:
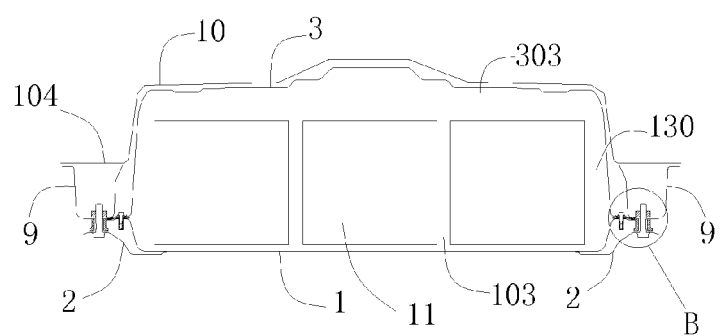
FIG. 3 is a schematic cross sectional view of the mounting structure along line A-A shown in FIG. 2.

As shown in FIGS. 1-6, in one embodiment, a mounting structure for an in-vehicle power battery may comprise: a body floor 10, an upper cover 3, a suspension tray 1 and a bracket device 2 for supporting at least a part of a peripheral bottom portion of the suspension tray 1. And the bracket device 2 may be detachably fixed to a bottom surface of the body floor 10. The suspension tray 1 may be hermetically connected with the upper cover 3, forming a sealed space 130 for receiving the power battery 11, as shown in FIG. 3. As shown in FIG. 3, the upper cover 3 and the suspension tray may be provided under the body floor 10, and the body floor 10 may be configured to accommodate the suspension tray 1 hermetically connected with the upper cover 3. As shown in FIG. 3, the body floor 10 is formed into a concaved one, so that the upper cover 3 may be accommodated therein. However, the present disclosure may not be limited hereto. For example, the body floor 10 may also be formed into a flat one. In addition, it should be noted that the body floor is described here in a general meaning, and it may be the body floor of a motorized vehicle, bus, heavy transportation truck etc. that may be powered by a power battery.

In one embodiment, as shown in FIGS. 1 and 3, the mounting structure may further comprise a supporting beam 9 formed on the bottom surface 104 of the body floor 10 surrounding the upper cover 3 and the suspension tray 1. As shown in FIG. 3, the supporting beam 9, the upper cover 3, the suspension tray 1 and the bracket 2 may be provided under the body floor 10, the bracket device 2 may be detachably and fixedly connected to the supporting beam 9 and the supporting beam 9 is fixed to the body floor 10.

In one embodiment, the supporting beam 9 may be configured to be square, rectangular or other annular shaped form, only if it may surround the suspension tray 1.

In one embodiment, the suspension tray 1 is formed with a first joint portion 101 at a peripheral edge thereof; and the upper cover 3 is formed with a second joint portion 301 at a peripheral edge thereof which is configured to be hermetically and detachably fixed with the first joint portion 101, with an elastic peripheral sealing member 4 being clamped therebetween. During assembly, the peripheral sealing member 4 is tightly compressed between the first joint portion 101 and the second joint portion 301 for sealing purpose. By using the peripheral sealing member 4, such as an annular one, the sealing performance between the upper cover 3 and the suspension tray 1 may be accomplished.

Figure 4:
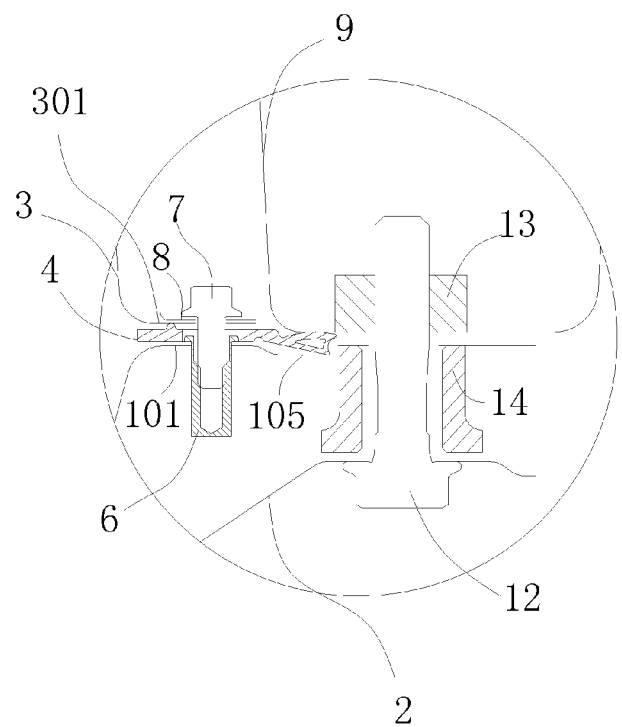
FIG. 4 is an enlarged schematic view of the Part B indicated in FIG. 3.

In one embodiment, the mounting structure may further comprise a plurality of water-proof nuts 6 and a plurality of corresponding first bolts 7. The water-proof nuts 6 may be fixed with the first joint portion 101. And as shown in FIG. 2, the water-proof nuts 6 may be distributed on the first joint portion 101 peripherally in regular intervals or evenly, with an end thereof being protruded downwardly. And the bolts 7 are correspondingly connected with the water-proof nuts 6 for detachably connecting the first joint portion 101 with the second joint portion 301. As shown in FIG. 4, the screw hole in the water-proof nut 6 is a blind one. Thus, even liquid like water may seep between the first joint portion 101 and the second joint portion 301, it can still not be further seeped inside the sealed space 130 to damage the power battery accordingly. In one embodiment, there are 4 water-proof nuts 6 along the first joint portion 101 at the left and right sides each and three water-proof nuts 6 along the first joint portion 101 at the top and down sides respectively in FIG. 2, with each side having the corresponding water-proof nuts 6. However, it should be noted that the number of the water-proof nuts may be configured as condition may require, and the number shown here is just for illustration purpose rather than for limitation.

As shown in FIG. 4, at least a portion 105 of the first joint portion 101 may be configured to be extended under the supporting beam 9, and an external edge of the peripheral sealing member 4 may be clamped between the portion 105 of the first joint portion 101 and the supporting beam 9.

Figure 5:
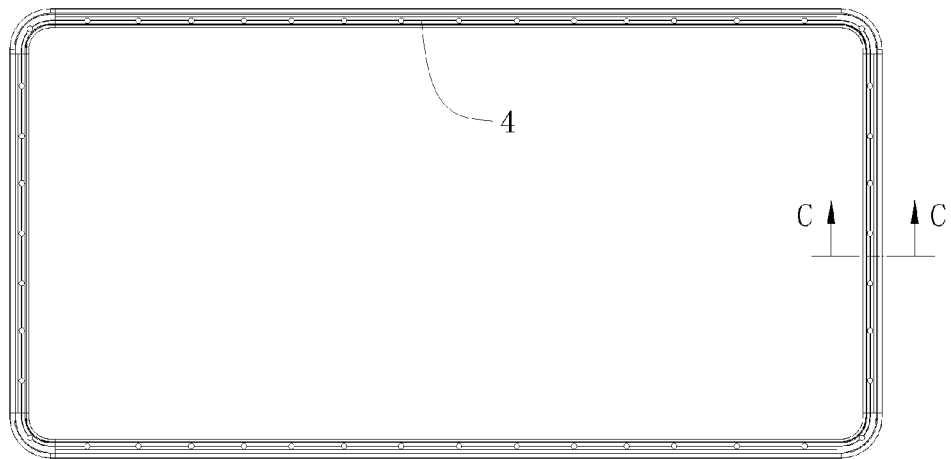
FIG. 5 is a schematic view of a seal ring in a mounting structure for an in-vehicle power battery according to an embodiment of the present disclosure.
Figure 6:
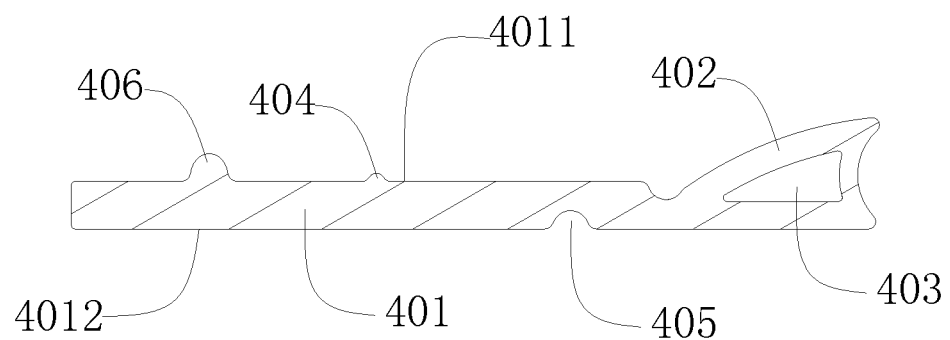
FIG. 6 is a cross sectional view of the seal ring along the line C-C shown in FIG. 5.
Figure 7:
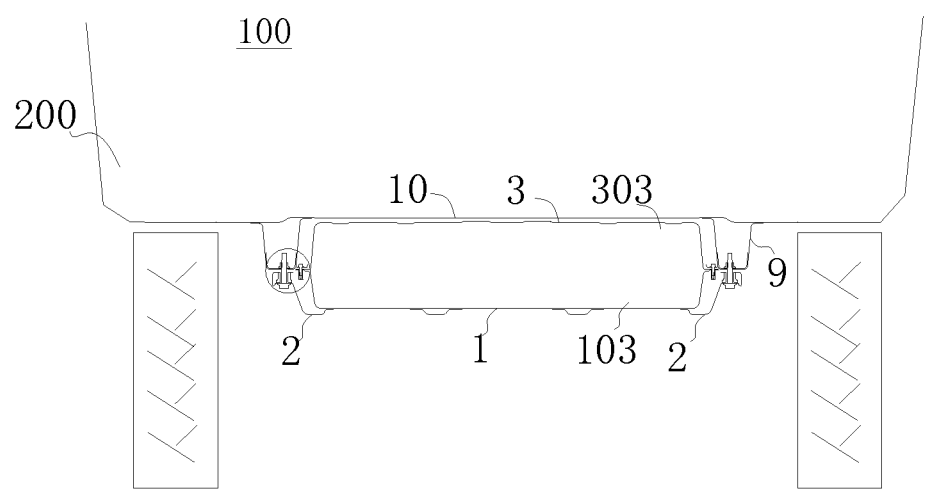
FIG. 7 is a schematic view of a vehicle comprising a mounting structure for an in-vehicle power battery according to another embodiment of the present disclosure.

As shown in FIGS. 5 and 6, the peripheral sealing member 4 may comprise a flat portion 401 clamped between the first joint portion 101 and the second joint portion 301 and a protuberant portion 402 connected with the flat portion 401 which may be clamped between the portion 105 of the first joint portion 101 and the supporting beam 9. Thus, with the structure of the peripheral sealing member 4 as described above, the sealing performance of the mounting structure may be dual-ensured by providing sealing between the upper cover 3 and the suspension tray 1 as well as between the supporting beam 9 and the first joint portion 105 simultaneously.

In one embodiment, the protuberant portion 402 may be formed with an inner chamber 403, so that the peripheral sealing member 4 may possess enhanced elastic deformation capability and enhance the sealing effects between the protuberant portion 402 and other members. Further, at least a rib protruding upwardly may be formed on an upper surface 4011 of the flat portion 401 in a peripheral direction of the peripheral sealing member 4, which is pressed against the second joint portion 301. As shown in FIG. 6, ribs 406, 404 may be formed on the upper surface 4011, and the ribs 406, 404 may deform easily, thus providing enhanced sealing performance.

As shown in FIG. 6, a peripheral groove 405 may be formed on a lower surface 4012 of the flat portion 401 adjacent where the flat portion 401 may be joined with the protuberant portion 402. In one embodiment, the peripheral groove 405 may be located where the portion 105 of the first joint portion 101 extended under the supporting beam 9 may be joined with the remaining portion of the first joint portion 101, and the portion 105 of the first joint portion 101 extended under the supporting beam 9 may be configured to be lower than the remaining portion of the first joint portion 101. Due to the peripheral groove 405, the protuberant portion 402 may be easily bent downwardly to provide improved sealing performance.

In one embodiment, the mounting structure may further comprise a peripheral pressure plate 8, as shown in FIG. 4. The peripheral pressure plate 8 may be configured to be provided on an upper surface of the second joint portion 301 and fixed therewith via the coupling of the first bolts 7 and the water-proof nuts 6. The peripheral pressure plate 8 may ensure improved uniform contact among the first joint portion 101, the peripheral sealing member 4 and the second joint portion 301.

As shown in FIG. 3, the suspension tray 1 may be formed with a first concaved chamber 103. The first joint portion 101 surrounds the first concaved chamber 103. The upper cover 3 may be formed with a second concaved chamber 303. The second joint portion 301 surrounds the second concaved chamber 303, and the first concaved chamber 103 and the second concaved chamber 303 together form the sealed space 130.

From the mounting structure as described above, because all the members or elements are provided under the body floor 10 and tightened thereto, an impact design may be provided accordingly, which is convenient for assembly and maintenance.

As shown in FIG. 4, the bracket device 2 may be connected with the supporting beam 9 via coupling of a plurality of second bolts 12 with corresponding nuts 13, and a supporting sleeve 14 may be fitted over the second bolt 12 and clamped between the bracket device 2 and the supporting beam 9 to adjust the threading strength of the bolts 12 and the nuts 13 and prevent the supporting beam 9 and the suspension tray 2 from being distorted by the coupling of the bolts 12 with the nuts 13. In one embodiment, the supporting beam 9 may comprise two cross-beams, two longitudinal beams fixedly connected to the longitudinal beams.

In one embodiment, the bracket device 2 may comprise four side frames 201 that are connected in series which are fixedly connected with the bottom portion of the suspension tray 1. In addition, the side frames 201 may be detachably connected with the supporting beam 9. The suspension tray 1 and the upper cover 3 are provided inside an area enclosed by the four side frames 201. The side frames 201, the supporting beam 9 and the vehicle floor 10 may form a protective structure to enhance the impact strength of the power battery received in the mounting structure in addition to improved sealing performance. Further, the mounting structure is compact compared with conventional art. In one embodiment, the bracket device 2 may further comprise at least a reinforcing frame (not shown) to improve the suspending strength of the mounting structure.

In one embodiment, as shown in FIG. 1, the bracket device 2 may comprise a plurality of main brackets 21 and at least an auxiliary bracket 22. Each of the main brackets 21 may be connected with the supporting beam 9 via the coupling of the second bolt 12 with the corresponding nut 13. And the auxiliary bracket 22 may be fixed with the suspension tray 1 and supports the immediate neighboring main brackets 21 at both ends thereof respectively. Further, each of the auxiliary brackets 22 may be, detachably or fixedly, connected with the supporting beam 9. For this structure, the bracket device 2 may be more easily manufactured and assembled to the body floor 10 compared with an integral one.

According to the mounting structure of the present disclosure, the suspension tray 1, the peripheral sealing member 4 and the upper cover 3 may form a sealed structure, and the suspension tray 1, the peripheral sealing member 4, the supporting beam 9 and the body floor 10 may form another sealing structure for the power battery. Through both of the sealing structures, the power battery may be protected from external contamination or damage, such as water or dusts etc.

In the following a vehicle comprising the above mounting structure will be described in detail. As shown in FIG. 6, the vehicle 100 may comprise a vehicle body 200. And the mounting structure according to an embodiment of the present disclosure may be provided under the body floor 10. Due to the sealing performance of the hermetically connected upper cover 3 and the suspension tray 1, liquid such as water etc. may not flow into the sealed space 130, thus ameliorating the negative damage caused by liquid seepage etc.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A mounting structure for an in-vehicle power battery, comprising:
   a body floor of a vehicle;
   an upper cover provided below the body floor, wherein the upper cover is formed with a second joint portion at a peripheral edge thereof;
   a support tray hermetically connected to the upper cover, the support tray forming a sealed cavity with the upper cover for receiving the power battery, wherein the support tray is formed with a first joint portion at the peripheral edge thereof;
   a bracket device for supporting at least a portion of a peripheral bottom portion of the support tray, wherein the bracket device is detachably fixed to a bottom surface of the body floor;
   a supporting beam formed on the bottom surface of the body floor surrounding the upper cover and the support tray, wherein the bracket device is detachably connected to the supporting beam; and
   wherein:
   the second joint portion is configured to be hermetically and detachably fixed to the first joint portion with an elastic peripheral sealing member being clamped therebetween,
   the sealing member includes a flat portion clamped between the first joint portion and the second joint portion and a protuberant portion connected to the flat portion and clamped between the portion of the first joint portion and the supporting beam, and
   at least a portion of the first joint portion is configured to be extended under the supporting beam, and an external edge of the sealing member is clamped between the portion of the first joint portion and the supporting beam.

2. The mounting structure of claim 1, further comprising:
   a plurality of water-proof nuts fixed with the first joint portion which are distributed on the first joint portion peripherally; and
   a plurality of first bolts, each first bolt being connected to a corresponding water-proof nut for detachably connecting the first joint portion with the second joint portion.

3. The mounting structure of claim 1, wherein the protuberant portion is formed with an inner chamber.

4. The mounting structure of claim 1, wherein the bracket device is connected to the supporting beam via coupling of a second bolt with a corresponding nut, and a supporting sleeve is fitted over the second bolt and clamped between the bracket device and the supporting beam.

5. The mounting structure of claim 1, wherein at least a peripheral rib protruding upwardly is formed on a top surface of the flat portion of the sealing member, which is pressed against the second joint portion.

6. The mounting structure of claim 1, wherein a peripheral groove is formed on a bottom surface of the flat portion adjacent where the flat portion is joined with the protuberant portion.

7. The mounting structure of claim 6, wherein the peripheral groove is located where the portion of the first joint portion extended under the supporting beam is joined with the remaining portion of the first joint portion, and the portion of the first joint portion extended under the supporting beam is configured to be lower than the remaining portion of the first joint portion.

8. The mounting structure of claim 2, further comprising a peripheral pressure plate configured to be located on a top surface of the second joint portion and fixed therewith via the coupling of the first bolts and the water-proof nuts.

9. The mounting structure of claim 1, wherein the bracket device comprises:
   a plurality of main brackets, each of which is connected to the supporting beam via the coupling of the second bolt with the corresponding nut; and
   at least an auxiliary bracket which is fixed with the support tray and supports the main brackets respectively.

10. A mounting structure for an in-vehicle power battery, comprising:
    a body floor of a vehicle;
    an upper cover provided below the body floor;
    a support tray hermetically connected to the upper cover, the support tray forming a sealed cavity with the upper cover for receiving the power battery;
    a supporting beam formed on the bottom surface of the body floor surrounding the upper cover and the support tray;
    a bracket device for supporting at least a portion of a peripheral bottom portion of the support tray, wherein the bracket device is detachably fixed to the supporting beam; and
    wherein the support tray is formed with a first joint portion at a peripheral edge thereof; and the upper cover is formed with a second joint portion at a peripheral edge thereof which is detachably fixed with the first joint portion with an elastic peripheral sealing member being clamped therebetween, the sealing member having:

a flat portion clamped between the first joint portion and the second joint portion; and a protuberant portion connected to the flat portion and clamped between the portion of the first joint portion and the supporting beam; and wherein at least a portion of the first joint portion is extended under the supporting beam, and an external edge of the sealing member is clamped between the portion of the first joint portion and the supporting beam.

11. A vehicle comprising a mounting structure according to claim 1.

* * * * *